April 8, 1952 — J. W. SMITH — 2,591,973
CITRUS FRUIT UTENSIL
Filed June 20, 1946
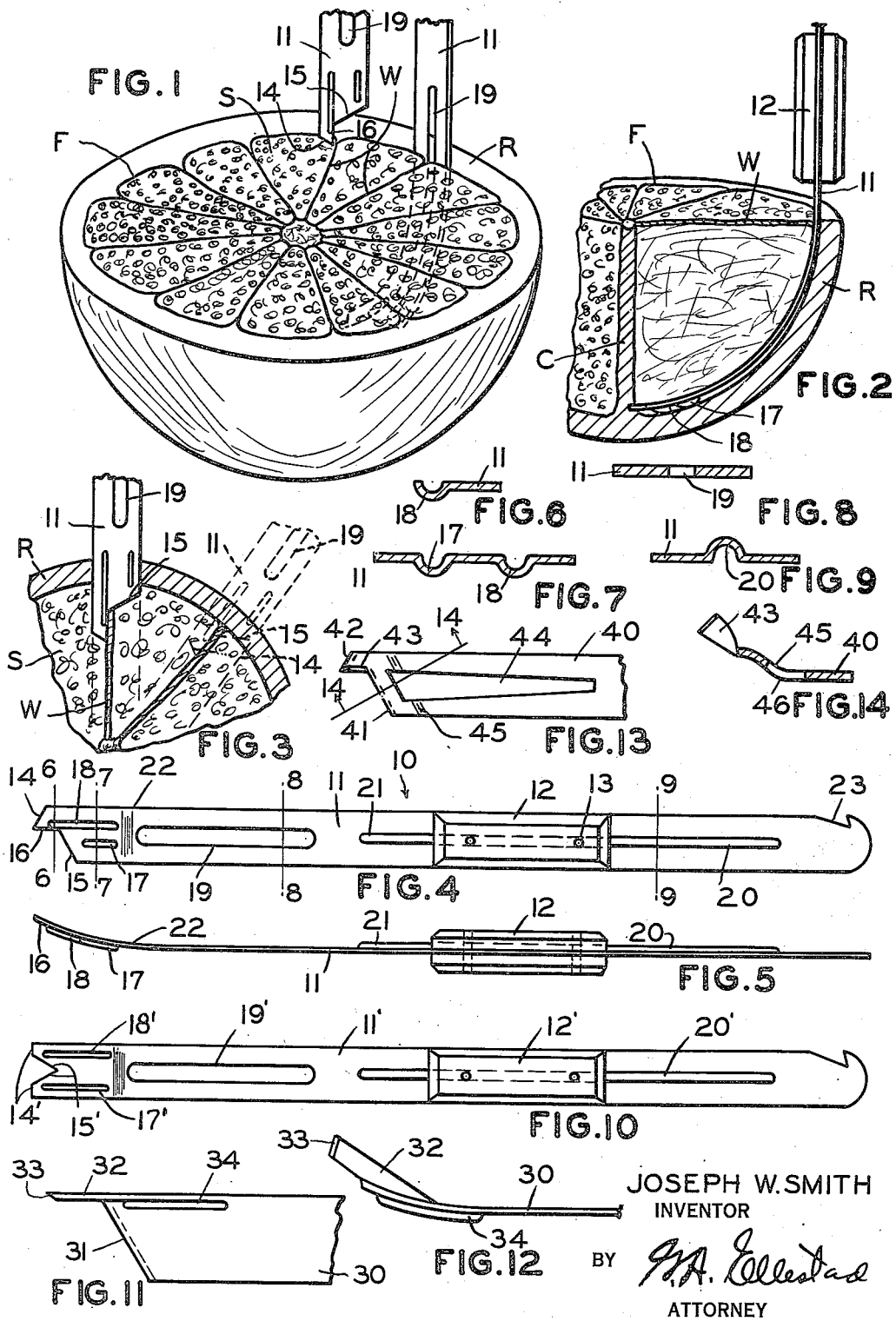
JOSEPH W. SMITH
INVENTOR Patented Apr. 8, 1952

2,591,973

UNITED STATES PATENT OFFICE 2,591,973

CITRUS FRUIT UTENSIL

Joseph W. Smith, Cambridge, Mass.

Application June 20, 1946, Serial No. 678,058

4 Claims. (Cl. 30—24)

This invention relates to utensils which are used for preparing citrus fruit for table service.

When serving fresh citrus fruit, such as grapefruit or oranges, at the table, it is customary to serve halves of the fruit so that the edible pulp may be removed and eaten with a spoon. Under the usual practice, an effort is made to sever the edible pulp so that it may be removed readily, leaving the fibrous non-edible portions, known as the rag, adhering to the rind of the fruit. With the prior art utensils, however, it is difficult to sever all of the edible pulp completely from the rind and the rag. As a consequence, some of the edible pulp is usually wasted and juice is spattered when an attempt is made to remove the unsevered portions of the pulp.

It is an object of the present invention to provide an improved utensil for use on citrus fruit whereby the foregoing disadvantages will be eliminated. Another object is to provide a utensil of the type described which may be used for quickly and efficiently removing the non-edible portions from citrus fruit. A further object is to provide such a utensil which may be used for completely severing the non-edible portions and partially severing the edible pulp from the rind of a citrus fruit. These and other objects and advantages reside in certain novel features of construction, arrangement and combination of parts as will hereinafter be more fully described and pointed out in the appended claims.

Referring to the drawings:

Fig. 1 is a perspective view of a half of a citrus fruit illustrating the operation of my improved utensil.

Figs. 2 and 3 are other views illustrating the operation of my utensil.

Fig. 4 is a top plan view of the utensil embodying my invention.

Fig. 5 is a side view thereof.

Figs. 6, 7, 8, and 9 are sectional views taken, respectively, on lines 6—6, 7—7, 8—8, and 9—9 of Fig. 4.

Fig. 10 is a top plan view of a modified form of my device.

Fig. 11 is a fragmentary top plan view of another modified form of cutting end of the utensil.

Fig. 12 is a side view thereof.

Fig. 13 is a fragmentary top plan view of a further modification.

Fig. 14 is a sectional view taken on line 14—14 of Fig. 13.

A preferred embodiment of my invention is disclosed in the drawings wherein 10 indicates, generally, my utensil which embodies a relatively long, flat resilient blade 11 which may be formed of any suitable material such as stainless steel or plastic material, for example.

A handle or gripping member 12 is preferably provided intermediate the ends of the blade 11. The handle 12 may be formed of wood or plastic blocks which are secured to the blade 11 by rivets 13 or the handle may be otherwise formed and attached in any suitable manner.

One end of blade 11 terminates in a piercing portion comprising a relatively narrow cutting edge 14 which is positioned forwardly of the wider cutting edge 15 and is connected therewith by a longitudinally extending guide member 16, the function of which will be presently explained. When the blade 11 is formed of plastic material, sharp metal cutting edges may be attached thereto by rivets or other suitable means.

When using my utensil, the end of the blade is inserted at the outer top edge of a half of a citrus fruit F, as shown in Fig. 1. The forward cutting or piercing edge 14 is inserted between the rind R and the edible pulp segment S so that the dull guide member 16 is positioned against the fibrous partition or wall W. The blade is then pushed downwardly and is flexed so that it bears against the inner surface of rind R as the cutting edges 14 and 15 are moved into cutting engagement with the core C, as shown in Fig. 2.

In order to keep the cutting edges 14 and 15 from digging into the inner surface of rind R as the blade is moved thereover, guide shoe means, such as spaced projections 17 and 18, are formed so as to be adjacent to and extend below the planes of the cutting edges 14 and 15. Such guide shoe means may be formed integrally with the blade as by striking the projections 17 and 18 below the plane of the blade or the guide shoe means may be formed by welding, soldering or otherwise attaching suitable lugs of material on the under side of the blade adjacent the cutting edges.

As shown in Fig. 4, the guide shoe means are preferably spaced on opposite sides of the longitudinal axis of the blade 11 with the guide shoe 18 substantially parallel with and contiguous to the guide member 16. As the blade is pushed downwardly and inwardly along the inner surface of the rind R, it will be apparent that the guide shoe means will ride along the inner surface of the rind and will serve to keep the cutting edges 14 and 15 slightly elevated so that they will not dig into the rind. Although I prefer to use two spaced guide shoes, it is to be understood that a single guide shoe will also serve to keep the cutting edges from digging into the rind.

Since, as shown in Fig. 2, the blade 11 must be flexed so as to follow the inner contour of the rind R, it is essential that the blade possess the proper resilience. This may be accomplished in any suitable manner such as making the blade thinner between the cutting edges and the handle 12 or by cutting or punching an open slot 19 in the blade 11. While a portion of the blade should be resilient, it is also desirable that the portion of the blade 11 adjacent handle 12 be relatively stiff. The desired stiffness may be obtained, for example, by means of the stiffening rib 20 which is struck up from the central portion of the blade. The stiffening rib 20 preferably extends a short distance beyond the handle 12 and towards the cutting edges so that the end portion 21 of the rib 20 provides a fulcrum about which the blade flexes when in use. The blade 11 is preferably formed with an upturned end portion, as shown at 22, in order to facilitate the insertion and guidance of the blade in the citrus fruit.

The operation of my utensil will be apparent from Figs. 1–3. The sections of the edible pulp are first separated from the fibrous side walls by passing therebetween any suitable knife or cutting member such as the flat end of blade 11 which is shown to the right of handle 12 in Fig. 4. As shown in Fig. 1, the blade is inserted so that the forward cutting edge 14 enters the edible pulp segment S at its juncture with the rind R and with the dull guide member 16 contacting the fibrous segment wall W. As the blade is pushed downwardly and inwardly, a slight backward pressure is applied so that the blade will flex and follow the contour of the inner surface of the rind. The movement of the blade is continued until the cutting edges 14 and 15 cut into the central core C as shown in Fig. 2. As the blade is moved downwardly and inwardly, it will be apparent that the cutting edge 15 will cut the fibrous wall W free from its attachment to the rind R. In this manner the blade is successively used to cut each fibrous wall from the rind. The successive engagements of the cutting edges with the core C will, of course, completely sever the core from the rind. The entire rag or non-edible portion of the citrus fruit consisting of the core and the attached fibrous walls may then be lifted out bodily by any suitable means such as the hook 23 formed on the other end of blade 11.

From Fig. 3 it will be apparent that the blade will not only sever the non-edible portion but will also sever a portion of the edible pulp from the rind R. The successive paths of the blade, shown in dotted lines on Fig. 3, will clearly indicate that while the non-edible portions are completely severed the edible pulp portions are only partially severed. As a consequence, the non-edible fibrous parts may be removed completely while the edible pulp segments will adhere to the rind by partial connections so that they may be easily and completely removed with a spoon.

As previously mentioned, the guide member 16 extending longitudinally of the blade serves to guide the blade so that the cutting edge 15 will cut the fibrous wall from the rind. The guide shoe means 17 and 18 projecting below the planes of the cutting edges ride along the inner surface of the rind and prevent the cutting edges from digging into the rind. The longitudinally extending slot 19 is centrally positioned so that it will ride along the slight ridge which is left when the fibrous wall has been severed. The cutting edges of the blade are thereby guided and directed so as to perform their functions efficiently.

The modification shown in Fig. 10 comprises a blade 11' having the handle portion 12'. The blade 11' is formed of a resilient material and is provided with the central slot 19' and the integral stiffening rib 20'. The cutting end of the blade is provided with the narrow forward cutting edges 14' and the wider converging cutting edges 15'. Guide shoe means extending below the planes of the cutting edges are formed by striking down the two spaced grooves 17' and 18' or in any other suitable manner. In using this modification, the blade is guided and directed by means of the guide shoe means 17' and 18', the converging cutting edges 15 and the slot 19'.

A further modification of the cutting end of the blade is shown in Figs. 11 and 12 in views exaggerated for sake of clearness. In this modification, the blade 30 is formed with the inclined cutting edge 31 and the forwardly projecting guide member 32 terminating in a narrow cutting edge 33. The guide member 32 is contiguous to one end of cutting edge 31 and lies in a plane which is substantially perpendicular to the plane of the blade 30. The guide member 32 is preferably made integral with the blade 30 by forming up a portion adjacent one end of the cutting edge 31. A projection 34 integrally formed with the blade 30 and extending below the plane of the cutting edge 31 provides guide shoe means. In using this modification, the guide shoe means 34 prevents the cutting edge 31 from digging into the rind of the citrus fruit and the guide member 32 serves to direct the blade along the fibrous wall and into the core of the fruit.

In the modification shown in Figs. 13 and 14, the blade 40 has a relatively wide cutting edge 41 and the narrow forward cutting edge 42. Located between the two cutting edges is the internally formed guide member 43 which extends upwardly from and substantially perpendicular to the planes of the cutting edges. The forward edge of the guide member may be sharpened for cutting action. The blade 40 is provided with a diverging slot 44 which adds resiliency to the blade and aids in guiding the movement of the blade by riding along the slight ridge which is left after the fibrous wall has been severed from the rind. The end of the blade adjacent the cutting edge is formed with a kink or bend 45 so that the portions of the blade on opposite sides of slot 44 provide two spaced guide shoes as indicated at 46. As the blade 40 is moved along the inner surface of the rind of the citrus fruit, the guide member 43 directs the movement and the guide shoes 46 prevent the cutting edges from digging into the rind.

From the foregoing, it will be apparent that I am able to attain the objects of my invention and provide a utensil which may be used for efficiently removing the non-edible portion from a half of a citrus fruit. Various modifications may be made without departing from the spirit of the invention as pointed out in the appended claims. The blade may be made of any suitable resilient material and good results have been attained with blades made of either stainless steel or plastic material such as celluloid. When non-metallic material is used for the blade, steel cutting edges are preferably attached to the non-metallic blade by rivets or the like. All of the cutting edges embodied in my utensil are preferably straight so that they may be easily sharpened. Other obvious modifications will also occur to those skilled in the art.

I claim:

1. A utensil for severing the non-edible partitions and core from a citrus fruit comprising a relatively long resilient blade having at one end thereof two cutting edges spaced one ahead of the other and lying, respectively, in two different planes which extend transversely of the longitudinal axis of the blade, and a guiding edge on said blade connecting said cutting edges and extending substantially parallel to said axis whereby the blade may be inserted into the top edge of a half of a citrus fruit and pushed downwardly and inwardly along the inner surface of the rind of the fruit so that said cutting edges sever the partition and core from the rind and partially sever the edible pulp from the rind as said guiding edge directs the movement of the blade.

2. A citrus fruit utensil comprising a relatively long resilient blade having at one end portion thereof two cutting edges spaced longitudinally along the blade and lying in planes extending across the longitudinal axis of the blade, said edges being connected by a longitudinally extending guide member comprising an edge on the blade, and a pair of guide shoes extending below the plane of the cutting edges and spaced on opposite sides of the longitudinal axis of the blade, said end portion being formed upwardly from the plane of the blade whereby the blade may be inserted at the top edge of a half of a citrus fruit and pushed downwardly and inwardly so that the cutting edges will completely sever the non-edible portions and will partially sever the edible portions from the rind as the guide member directs the movement of the blade and the guide shoes ride along the inner surface of the rind and prevent the cutting edges from digging therein.

3. A citrus fruit utensil comprising a relatively long resilient blade having at one end a transversely extending cutting edge, a guide member formed as an edge of the blade and extending forwardly of the cutting edge at one end thereof, said member lying in a plane which is substantially perpendicular to the plane of the cutting edge, and guide shoe means adjacent to and projecting below the plane of the cutting edge, said guide member terminating in a piercing edge whereby the piercing edge may be inserted adjacent the rind in the top edge of a half of a citrus fruit and the blade pushed downwardly and inwardly so that the cutting edge will sever the wall and core from the rind as the guiding member directs the movement of the blade and the guide shoe means prevents the cutting edge from digging into the rind.

4. A citrus fruit utensil comprising a relatively long resilient blade having two cutting edges lying in planes extending transversely of the blade and with one cutting edge spaced forwardly of the other, a guide member formed by an edge of the blade and extending longitudinally thereof to connect the cutting edges, said guide member lying in a plane which is substantially perpendicular to the planes of the cutting edges, said blade having a diverging slot adjacent said cutting edges and extending longitudinally of the blade, the portions of the blade at the sides of the slot being depressed to provide guide shoe means whereby the blade may be inserted in the top half of a citrus fruit and moved downwardly and inwardly so that the cutting edges sever the fibrous partitions and core from the rind with the guide member and slot directing the movement of the blade and with the guide shoe means riding along the inner surface of the rind and preventing the cutting edges from digging into the rind.

JOSEPH W. SMITH.

REFERENCES CITED

The following references are of record in the file of this patent:

UNITED STATES PATENTS

| Number | Name | Date |
|---|---|---|
| D. 49,638 | Barlow et al. | Sept. 12, 1916 |
| 1,479,015 | Steinman | Jan. 1, 1924 |
| 1,638,956 | Pinchbeck et al. | Aug. 16, 1927 |
| 1,668,226 | Barfield | May 1, 1928 |
| 1,794,800 | Smith | Mar. 3, 1931 |
| 2,022,954 | Cook | Dec. 3, 1935 |